United States Patent Office 3,441,724
Patented Apr. 29, 1969

1

3,441,724
OPTICAL CORRELATOR
Donald R. Taylor, Jr., Philadelphia, Pa., assignor to Philco-Ford Corporation, Philadelphia, Pa., a corporation of Delaware
Filed Dec. 8, 1964, Ser. No. 416,739
Int. Cl. G06g 9/00
U.S. Cl. 235—181                    3 Claims

ABSTRACT OF THE DISCLOSURE

A self-scanning electro-optical correlator for use in pattern recognition and comprising a birefringent delay line into which information to be correlated is fed in the form of an amplitude modulated ultrasonic vibration for propagation through the delay line as a mechanical stress wave. The delay line is irradiated with polarized light and the modulations of light induced by such stresses are observed through an analyzer and a plurality of readout slits located along the axis of stress propagation. To test correlation the modulated light is transmitted through templates containing coded replicas of the recognition pattern.

---

This invention relates to the data processing field and more particularly to a novel method and apparatus for obtaining high-speed, large interval correlation using photoelastic delay means.

Correlators are currently used in the performance of spatial filtering processes for pattern recognition and have application to a number of diverse fields. Possible applications include the preliminary screening of large numbers of aerial reconnaissance photographs for automatic recognition equipment, high-speed memory search for content, high-speed print reading, radar echo pulse return and computer-generated data analyses, and the generation of autocorrelation patterns.

Present approaches to automatic pattern recognition systems for screening aerial reconnaissance photographs utilize multilayered decision structures. Part of the process involves detection of certain significant features in the input image as an initial step with subsequent layers of logic for final recognition. The number of features required for recognition must be large if the system is to be capable of recognizing many classes of objects. The number of elements in the image to be examined is also very large. These requirements, added to the need for speed, make it difficult to achieve the desired feature detection function using state-of-the-art devices.

Accordingly, it is a general object of the present invention to provide an optical correlation system which overcomes the limitations and deficiencies of the prior art.

Another object of the invention is to provide an optical correlator having large storage capacity combined with high input rate.

It is a further object of the invention to provide a correlation system which can be freely adapted to different applications without change in complementary circuits or basic correlator structure, and which permits the handling of different recognition problems by the simple expedient of interchanging photographic storage masks. This degree of adjustment in known lumped constant lines or shift register devices would in each instance involve a new wiring assembly with attendant expense and loss of time.

It is also an object of the invention to provide a correlation system permitting the processing of gray-scale, or analog input data, as well as black and white, or binary input data. It is also a feature of the invention that photographic inputs can be scanned into video intelligence by the correlator itself without need for external scanning equipment.

2

Still another object of the invention is the provision of a compact correlation system of minimal size having low power consumption.

It is still another object of the invention to provide a correlator in which the basic costs per storage elements is considerably less than has hitherto been achievable.

Another object of the invention is the provision of an optical correlation system which eliminates the need for converting patterns, against which correlation is to be made, into electrical signals.

These and other objects within contemplation will be more readily understood by reference to the accompanying detailed description and drawings, in which.

The invention in an apparatus aspect consists of the provision of an electro-optical system in which information transiently stored in a photoelastic, birefringent delay line may be directly and optically correlated with an associated photographic storage mask without the need for converting the patterns against which correlation is to be made into electrical waves.

Information which is sought to be correlated may be an electrical waveform which, for example, may be the output of a computer, a radar receiver, or a memory device. It may also be in the form of a photograph, in which case it may be converted into an electrical signal by conventional scanning techniques such as would be provided by use of a flying spot scanner. This information is used to modulate a high frequency carrier which in turn is injected into the delay line by means of a transducer which acts to translate the signal-modulated carrier into an ultrasonic vibration for propagation through the delay line as a mechanical stress wave. The resulting stress pattern is irradiated by polarized light projected through the delay line in a direction transverse the axis of stress propagation. Since the birefringence of the delay line varies in accordance with the amplitude of the impressed stress the vibrational components of polarized light passing through the delay line undergo modulation in synchronism with the stress variations. This modulation when observed through an analyzer is seen as a variation in light intensity. When viewed through a plurality of readout slits disposed at discrete locations along the axis of stress propagation which slits define bits of information, the contents of the delay line appear as a moving array of intensity modulated light patterns. The modulated light coming from each of the readout slits is transmitted through a photographic mask or template, containing a coded replica of the recognition pattern against which correlation is sought which replica is in the form of a unique array of light transmissive areas or windows. In those instances in which it is desirable to give different weight to various portions of the pattern being correlated the masks may be divided into a specific area for indicating positive weighting for any bit location and an area for negative weighting. The magnitude of the weight to be applied is determined by the degree of exposure of that particular bit location on the mask during its preparation. Correlation of each bit in the input data array with the stored reference pattern on the mask is therefore simply the amount of light transmitted through the mask. The sign, positive or negative, is indicated by the location of the weight in either of the two specified mask areas; if the weight is positive, the negative weight space is opacified and the positive weight space is clear, and vice versa when the weight is negative. Correlation of the input pattern with the stored pattern is taken as the algebraic sum of all the positive and negative bit correlation quantities.

It will also be shown that the readout slits and correlation masks may be combined into a single mask capable of performing both readout and correlation mask functions.

Figure 1:
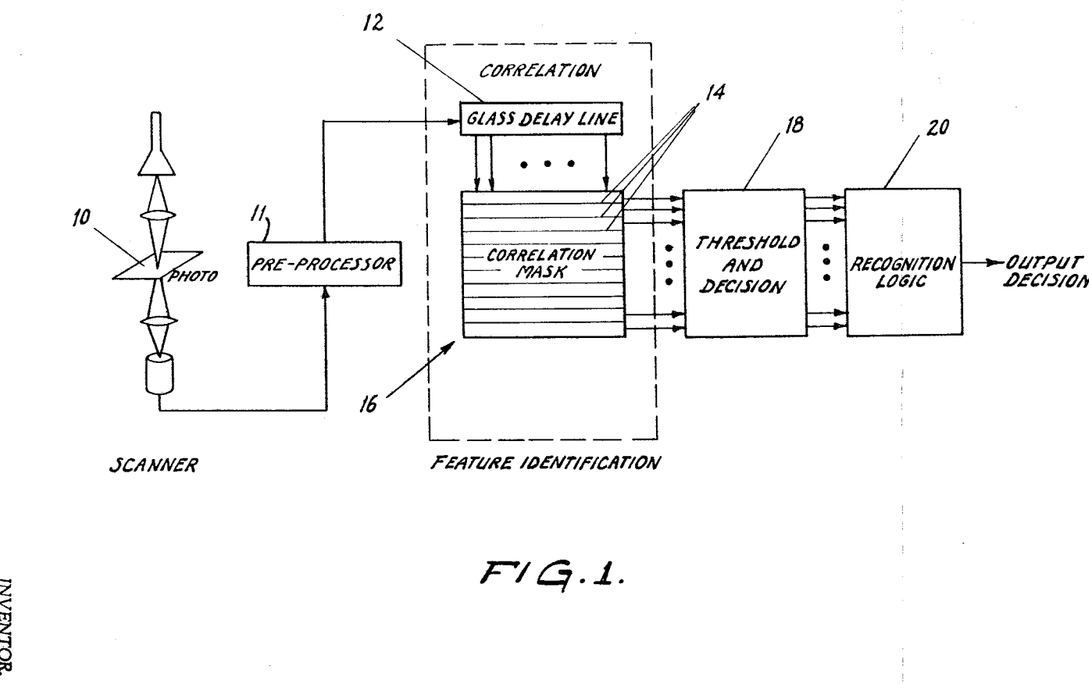
FIGURE 1 is a block diagram of a recognition system incorporating features of the present invention.

Referring to FIGURE 1, the invention is shown embodied in a typical data processing or recognition system. Those portions of the system lying outside the dashed line enclosure are known apparatus cooperable with the feature identification apparatus which constitutes the heart of the instant invention.

The information to be correlated is illustrated as contained on a photographic image is shown as being scanned into an electrical signal by conventional means which requires no detailed description herein, and is designated by the label "scanner." This signal is fed through the preprocessor 11 for subjection to some preprocessing technique such as edge detection and used to modulate a high frequency carrier which is inserted sequentially into the photoelastic delay line 12 through a transducing element not shown, and is correlated against masks 14 contained in the photographic reference template array 16. The delay line 12 is preferably although not necessarily of known glass or quartz type. Circuits 18 perform the decision function for their respective feature classes and results are forwarded to the recognition logic circuitry 20. The output decision may be used to activate any of a number of auxiliary devices such, for example, as pilot lights or other indications of identity between the input information and given recognition classes.

Figures 2, 2A, 2B:
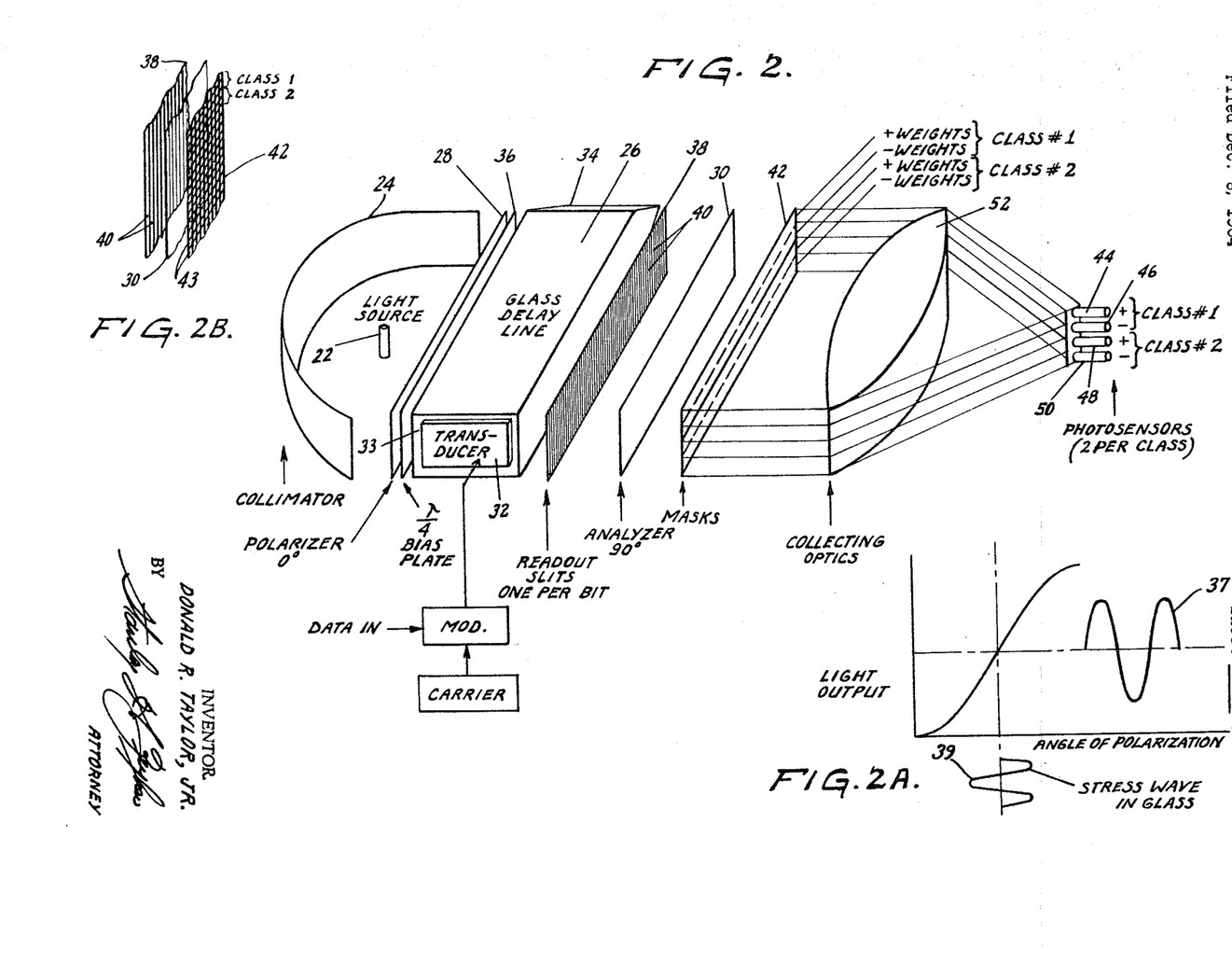
FIGURE 2 is a schematic showing of an optical correlator of the type adapted for use in the system shown in FIGURE 1, embodying the present invention.
FIGURE 2A is a graph showing the light intensity-stress characteristic of a birefractive delay line operated around the quarter wave bias position.
FIGURE 2B is an enlargement showing the construction of the readout and correlation masks schematically shown in FIGURE 2.

One form of correlator, of the type comprising the instant invention, usable in the recognition system shown in FIGURE 1 is schematically illustrated in FIGURE 2. For simplicity of illustration the correlator is shown with only two recognition classes, each class containing positively and negatively weighted mask portions. The illumination source for the correlator may be a conventional 100 watt mercury arc lamp 22, a laser, or other source. Light from this source is collimated, for example by a parabolic reflector 24, for projection through the system.

To permit modulation of the light an optically transparent birefractive delay line 26 is disposed between crossed polarizers 28 and 30. Quartz, glass and certain other materials, possess the property of becoming optically birefringent when mechanically stressed, and exhibit two markedly different refractive indices for mutually perpendicular light vibrations. As previously indicated polarized light projected through such material may be modulated by a stress-inducing signal propagated through the material. In the illustrated embodiment a block of quartz 26 approximately fifteen inches long by two inches wide by one inch thick, having a 100 microsecond delay characteristic, is employed as the light modulating delay media. As noted the video information to be correlated may be obtained by conventional scanning techniques, such as shown in FIGURE 1, and used to modulate a high frequency carrier for insertion into the delay line 26 in the manner schematically illustrated by block diagram in FIGURE 2. The video-modulated carrier is transduced into an ultrasonic vibration by means of a ceramic transducing element 32 bonded to an end face 33 of the quartz slab 26. An absorber 34 is formed on the other end to prevent reflection of the wave after it has traversed the length of the bar. The ultrasonic vibration is propagated through the delay line as a mechanical stress wave. Best results were obtained by using the shear mode of propagation. Operated in this fashion, and with 1,000 readout slits arrayed along the longitudinal axis of the delay line, the line can readily be used to provide readout at a rate of 10 megabits per second.

In describing the operation of the correlator it is assumed that a scanner and preprocessor generate a continuous ribbon of input data from the scanned photograph 10. The input data may be either in digital or analog form.

By interposing the delay line 26 between crossed polarizers 28 and 30 only light which has undergone phase modulation is transmitted through the system. In order to obtain a true reproduction of the variations in the stress wave in the delay line, which variations are a true replica of the input intelligence, a quarter wave bias plate 36 is interposed in the transmission path of the light to shift the modulation axis to the 45° bias point. A transfer curve, FIGURE 2A, showing the variation in light intensity with change in angle of polarization illustrates the effect of this biasing. By establishing the operating point in approximately the center of the transfer characteristic, linearity and sensitivity of response are maximized.

As stress waves propagate through the delay line 26, a variable birefringence is introduced in the optical path. As seen in FIGURE 2A the intensity of light emergent from the delay line, as represented by the waveform 37, varies in synchronism with the stress wave 39 impressed on the delay line. The stress is shown in FIGURE 2A as a simple sinusoidal variation for simplicity of illustration.

Provision is made for optically tapping the delay line 26 for information transiently stored therein by means of a readout mask 38 disposed along an edge of the delay line and provided with a plurality of transparent readout slits 40. Details of the slits can be seen in the enlarged showings of FIGURES 2B and 11. The slits are preferably of a width approximately a third the wave length of the RF carrier and spaced about 10 mils apart or what amounts to a grating frequency equal to that of the RF carrier. Information in the form of a stress analog of the video modulated signal sequentially fed to the delay line transducer progresses serially through the delay line in a time period which is dependent upon the length of the line and propagation velocity of the stress wave. In the illustrated embodiment, and as indicated above, the wave traverses the length of a 15 inch long quartz delay line in 100 microseconds.

It will be seen from the foregoing that continuously variable time delay can be attained by varying the position of the readout slit. To permit progressive readout of the intelligence as it traverses the delay line, a plurality of readout slits 40 is provided. As the input intelligence proceeds through the delay line as mechanical stress wave the light modulation pattern produced by that wave is viewed through the readout slits 40.

During traverse of the information through the delay line it is searched for a correlation with a template mask 42 positioned in the optical path beyond the second crossed polarizer 30. The serial feed-in made possible by this arrangement has the advantage of permitting testing of the correlations between the input data and template in all possible translational registrations as the signal progresses through the delay line. Threshold circuits, not shown, perform the decision for their respective feature classes and the results are forwarded to associated recognition logic by means well known in the art.

The modulated light coming from each slit location 40 is transmitted through the photographic mask 42 for all recognition classes. Only two classes are shown for simplicity of illustration.

Figure 11:
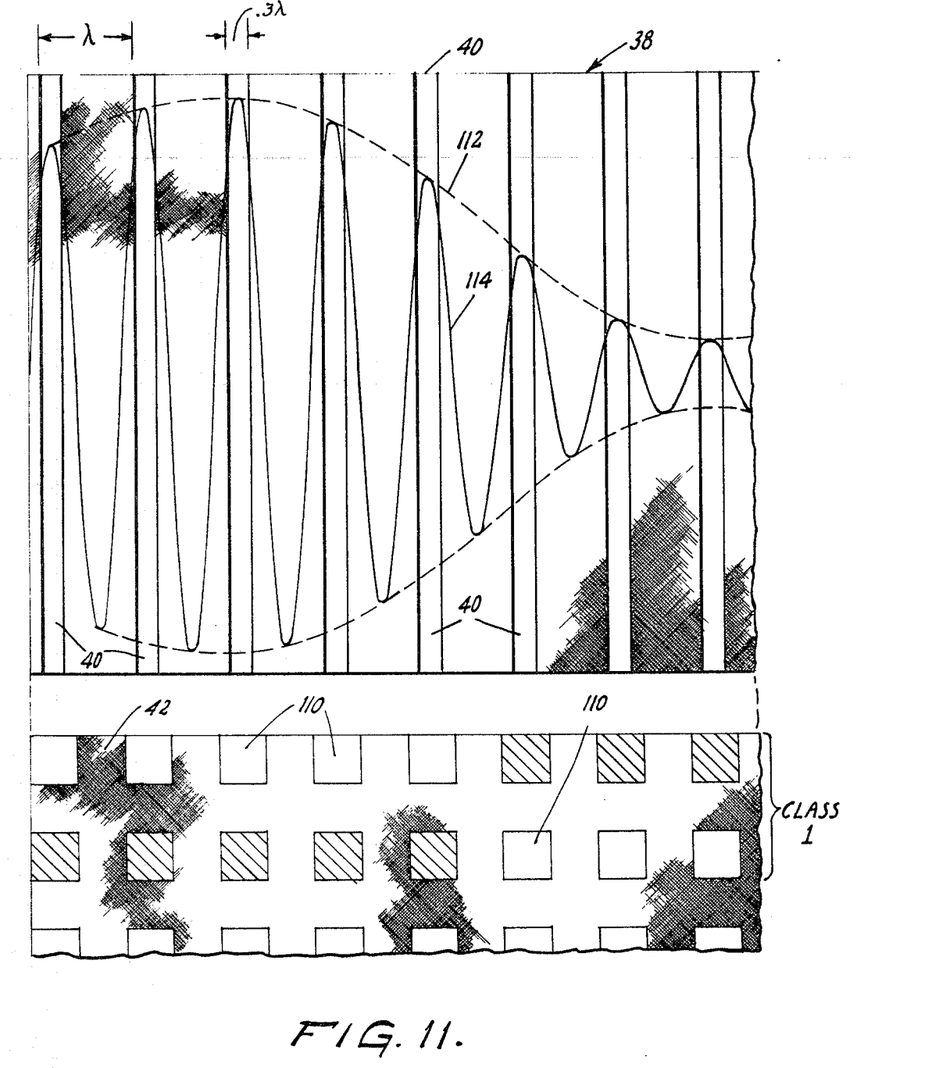
FIGURE 11 is a diagram illustrating the relationship between correlation and readout masks.

Having in mind that the modulation envelope 112 (FIGURE 11) of the stress wave 114 propagating through the delay line is a true replica of the information to be correlated and that light emergent from readout slits 40 may be selectively transmitted by the correlation mask 42 it may be desirable in a particular instance variously to weight different portions of the pattern to be correlated. To provide the desired "weighting" the masks are constructed in the manner to be described. An enlargement of the readout and correlation masks is shown in FIGURE 11. For convenience of illustration the correlation mask 42 is shown disposed below the readout mask 38. In actual use the readout mask, analyzer and correlation mask are in confronting relation (preferably in contact) as depicted in FIGURE 2B. Each recognition class in the correlation mask 42 is comprised of two horizontal rows of windows 110. In the embodiment shown in FIGURE 11, the top row of windows in each recognition class is reserved for positive weighting and the lower row is reserved for negative weighting. The magnitude of the weight to be applied is determined by the degree of exposure of that particular bit location on the mask during its preparation. Correlation of the input data array with stored reference patterns on the mask 42 is therefore simply in terms of the amount of light transmitted through the mask. The sign, positive or negative, is indicated by the location of the weight in either of the two specified mask areas, if the weight is positive the negative weight space is opaque and the positive weight space is transparent, and visa versa when the weight is negative. As is shown in what follows, correlation of the input pattern with the stored pattern is taken as the algebraic sum of all positive and negative bit correlation quantities. Photosensors 44 and 48, with their associated optics, are arranged to view the positive weight areas for their respective classes over the entire length of the delay line in the manner illustrated. Correspondingly photosensors 46 and 50 are arranged to view the negative weight areas for their respective classes and their outputs fed to inverters (not shown) before summing with the output of associated photosensors 44 and 48.

The word "weighting" as used in the context of this illustration means to use the light output of a given slit either to increase or decrease the net amplitude of the variation in light output, at the RF carrier frequency, signifying correlation. If the net amplitude of the variation is increased the weighting is referred to as positive, if decreased the weighting is referred to as negative. If it were desired, for example, positively to weight that portion of the pattern seen through the first five readout slits of FIGURE 11 (counting from left to right) and negatively to weight that portion of the pattern seen through the next three readout slits, the mask, insofar as recognition class No. 1 is concerned, would be constructed in the manner shown, the cross hatching in a given window indicating that the window has been made opaque. While as illustrated the windows are either transparent or opaque, it will be understood that the degree of opacity may be controlled in accordance with the weight desired to be given each individual area.

The optical system for gathering the light emergent from the windows 110 is schematically shown in FIGURE 2 as a cylindrical lens 52 designed to reduce the length of the viewed area to a dimension compatible with the photocathode size of the viewing sensor. The outputs for each class are then subtracted electrically and a threshold applied for making an output decision. The advantages of this system lie in the possibility of simultaneously correlating a large section of the serially presented input data with a very large number of reference patterns. The number of such classes is limited only by the practical problems of registry, class separation and physical location of the required photosensors.

It may be desirable from the standpoint of threshold stability to be able to sum the positive and negative mask correlations algebraically for a single class using a single sensor. This avoids the difficulty experienced in subtraction circuit balance and symmetry occassioned by use of a multisensor system. The embodiment shown in FIGURE 3 is designed to remedy this difficulty and provides an optical arrangement permitting algebraic summation of the negative and positive weighted bit correlations for each class by a single photosensor.

Figure 3:
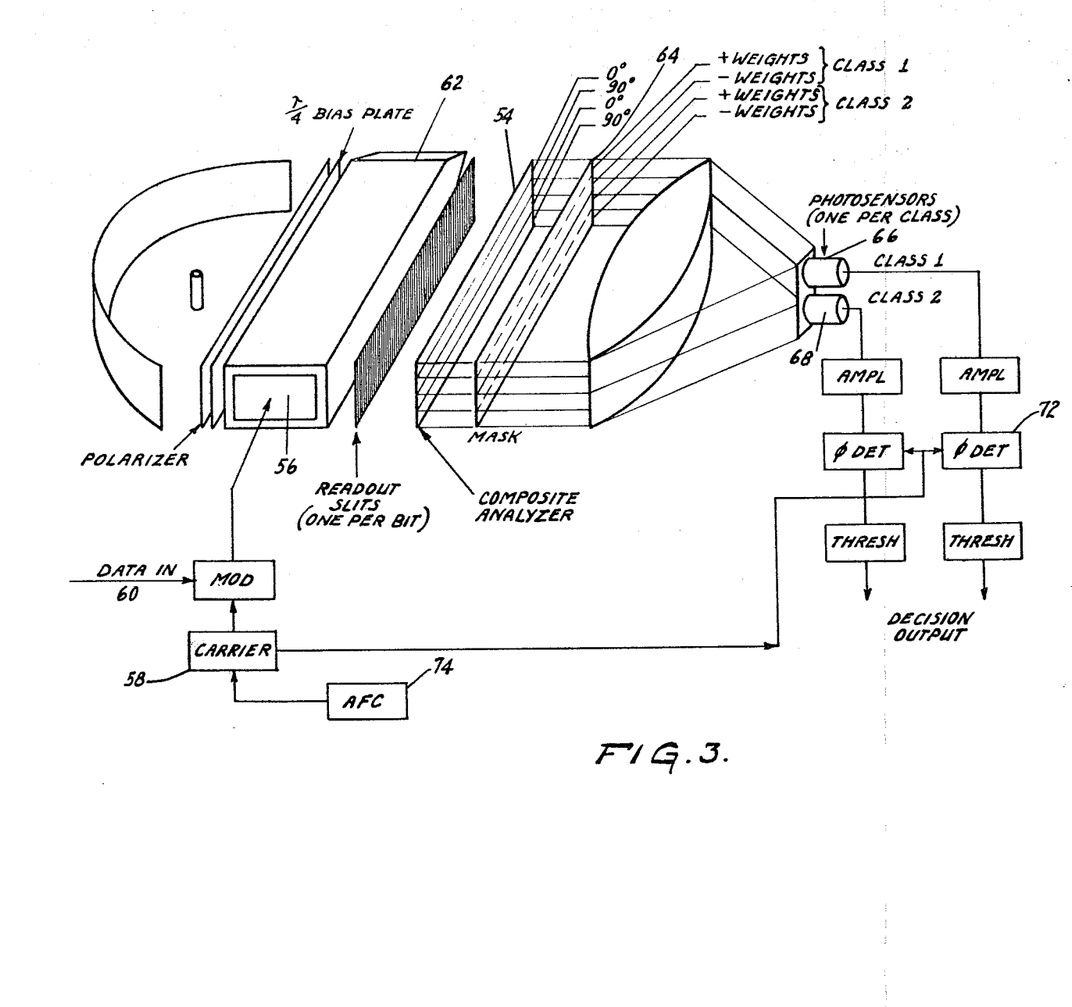
FIGURE 3 is a schematic showing of an alternative form of correlator embodying the present invention.

Referring to FIGURE 3 it will be seen that a composite analyzer 54 comprised of zero and ninety degree polarizers has been substituted for the single ninety degree analyzer of FIGURE 2, Additionally, the number of photosensors required for a given number of recognition classes has been reduced by one half.

An illustrative application of the invention using this correlator is to present to the delay line transducer 56 a high frequency carrier, generated at 58, modulated by a video signal 60 produced, for example, from a scanned photograph. This information progresses completely through the delay line 62 in 0.2 millisecond. Within this short time the information is searched for a correlation with a template mask 64 in all possible registrations as the video information serially progresses down the delay line. The correlator will inspect simultaneously for at least one hundred different correlations, only two being shown for simplicity of illustration. These one hundred simultaneous correlations of one thousand bit messages are performed at the rate of $10^7$ bits per second.

Photosensors 66 and 68 each view both the positive and negative mask areas of their respective classes which, when augmented by the composite analyzer, permits algebraic summation of all the bit correlation quantities, in the manner to be described. The arrangement equips all positive weight areas with a polaroid analyzer at the same orientation as the input polarizer and equips all negative weight areas with an analyzer oriented at ninety degrees thereto.

Figure 4:
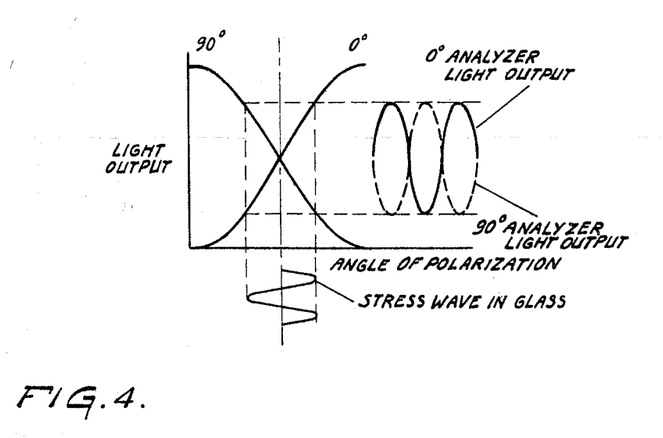
FIGURE 4 is a graph showing the light intensity-stress characteristic of a birefringent delay line as viewed through polarizers whose transmission axes are mutually perpendicular.

To explain the effect of these changes, let it be assumed that readout slits are spaced apart a distance equal to the wavelength of the RF carrier. With no modulation impressed on the system and as a result of the system being operated around the quarter wave bias position a certain light intensity is observed by the photosensor associated with each recognition class. Assuming that the output light is viewed through a zero degree analyzer and that the carrier is modulated by the input intelligence, those slits which view light instantaneously undergoing modulation by an increase in stress will pass light of a greater than average intensity. If it is desired to reverse the effect of any portion of such a stress pattern in terms of the instantaneous light output seen by a given photosensor, i.e., negatively to weight portions of the stress pattern, the light output from any given readout slit may be reversed by passing the light through a ninety degree analyzer. Refering to FIGURE 4 which depicts the transfer characteristic for zero and ninety degree analyzers operating around a quarter wave bias position it will be seen that by viewing the light emanating from a given slit through a ninety degree analyzer rather than a zero degree analyzer the effect of a given stress wave in terms of instantaneous light output is reversed.

Figure 5:
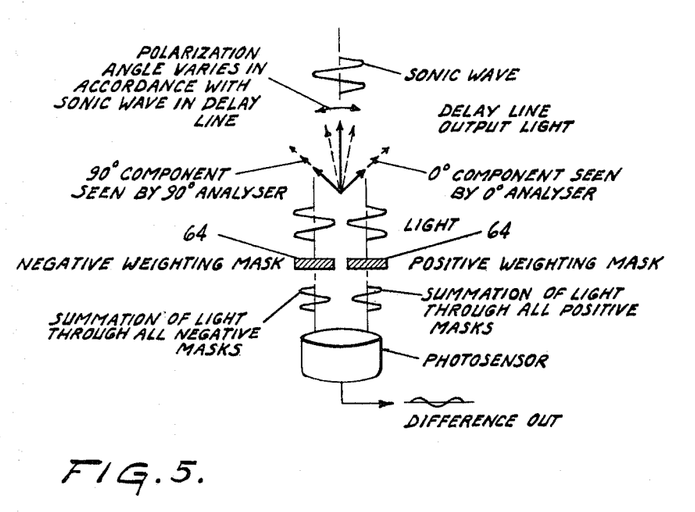
FIGURE 5 is a schematic representation illustrating the effect of using a composite analyzer in the optical correlation system illustrated in FIGURE 3.

Another way of looking at the effect produced by use of a composite analyzer is illustrated in FIGURE 5. Assume the mean position of the output light polarization, after passing through the quarter wave bias to be at forty-five degrees. Two analyzers illuminated by this light and arranged at zero and ninety degrees will analyze the incident light into its zero and ninety degrees components. Movement of this input light vector, caused by the stress wave and resultant change in index of refraction in the delay line, causes the variation in light transmitted by the two analyzers to be of opposite phase; i.e., when the light through the zero degree analyzer is instantaneously increasing, the light through the ninety degree analyzer is decreasing. A photosensor which views the light variations transmitted by both analyzers observes the difference. The polarity and magnitude of the signal which is transmitted to the photosensor can therefore be determined by introducing a mask 64 between the analyzers and the sensors in order selectively to transmit the light in some predetermined porportion. Of course, only one sign of weighting is used at any one bit location. The light shown coming through the masks 64 in FIGURE 5 refers to the summation of light from all the bit locations of each sign in a given class.

The electrical output of the single photosensor for each class is an RF signal whose amplitude represents the algebraic sum of the positively and negatively weighted input signals. The sign of the summation is indicated by the phase of the RF signal, i.e., either 0° or 180°. By using a phase detector 72, FIGURE 3, the sign, or sense of net correlation is obtained. The reference signal for the phase detector is the original delay line input carrier 58.

This system requires good registration of the viewing slits 70 with respect to the carrier valve in the delay line, in order that the light from all slits will add in phase for each direction of polarization. The function of the AFC block 74 in FIGURE 3 is to provide this registration.

Another technique for negatively weighting desired portions of the stress pattern is to use a single analyzer with a readout mask in which one row of slits of a given class is one half wave length displaced from the second row of slits of that class. By use of this arrangement the two rows of slits view patterns of light which are produced by portions of the stress wave which are 180° out of phase. By seletcively passing light from one or the other of these two rows portions of the input pattern in the delay line may be positively or negatively weighted.

This latter technique can be characterized as one employing shifted grating readout and requires for its operation that the system be operated about some finite bias in order that the positive and negative weighted portions of the signal be capable of algebraic summation by the photosensor. To obtain the sign of net correlation, phase detection is again employed.

Figure 6:
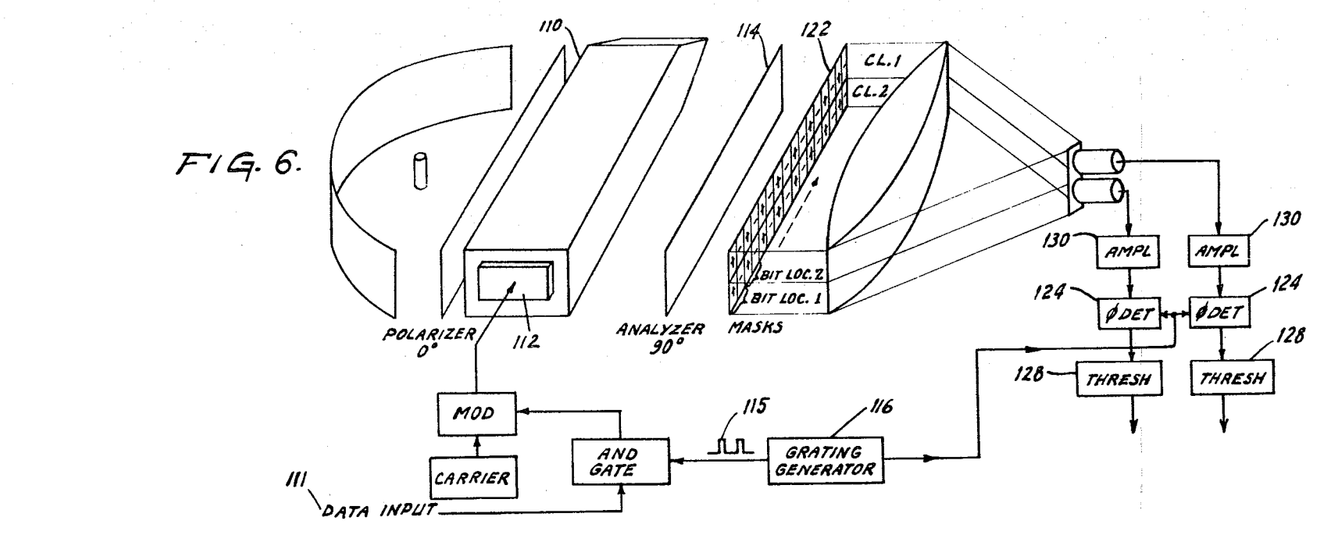
FIGURE 6 is a diagrammatic showing of a correlation system providing single sensor algebraic summation of negative and positive weighted correlations using electronic means.
Figure 7:
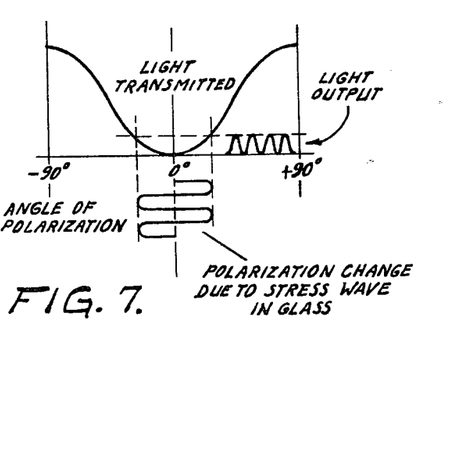
FIGURE 7 is a graph of the light intensity-stress characteristics of a birefractive delay line operated at zero bias.

Still another arrangement for providing single sensor algebraic summation of positive and negative weighted correlations is shown in FIGURE 6 and is based on the use of means for alternately presenting the positive and negative mask correlation quantities to the photosensor of each recognition class. The delay line 110 is uniformly illuminated by a collimated light source, as before, and input data 111 are again used to modulate a carrier which drives transducer 112. The quarter wave bias plate is omitted to place the operating point at minimum transmission. When operating at zero bias a burst of carrier causes a full-wave rectified light output when viewed through analyzer 114. The transfer characteristic for this mode of operation is shown in FIGURE 7. In this embodiment the function of the readout slits is performed by the correlation mask in which each slit consists of a positive and negative weighting area, only one slit being used at any given bit location.

Figure 8:
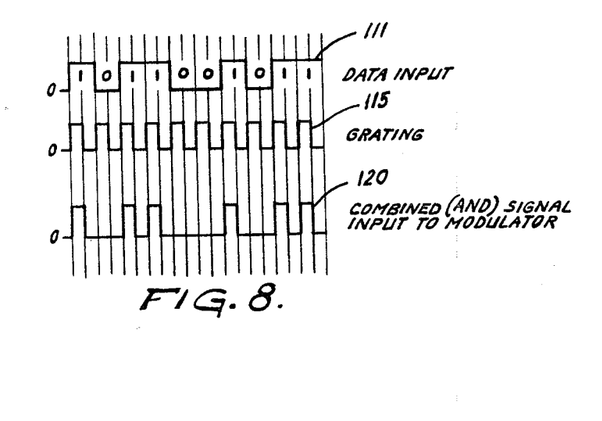
FIGURE 8 is a diagram of the electrical waveforms used to provide electronic sensing of the positive and negative weighted correlations.

In order to produce alternate presentation of the positive and negatively weighted light quantities to the photosensor associated with a given recognition class the waveform 115 (FIGURE 8), provided by grating generator 116, is interleaved with the digital input data 111. Every other bit location is made a zero to form the grating, the remaining bits represent the data by inserting an RF burst for a one and no RF for a zero. Each data bit is reduced to half its former duration and a zero is inserted between each bit. The grating and input signals 111 and 115 are fed to an "AND" gate to produce the modulator input signal 120. This in turn is used to modulate an RF carrier and the output used to drive the transducer 112 in the manner previously described.

Each recognition class in the mask format 122 consists of a single horizontal row of windows containing two possible positions for weighting at each bit location, the bit location being divided in half. For positive weighting, the first half is used, and for negative weighting the second half is used. As previously noted, the mask for each class weights each bit either positively or negatively by blacking out one of the two halves at each bit location and inserting the weight value in the other half by shading.

The effect of the moving grating 115 and the stationary mask format 122 is first to transmit to the photosensors the input data multipled by all the positive mask weights and then by all the negative weights. The sense, or sign, of the summation is determined by phase detectors 125 operating with a reference signal from the grating generator 116.

The "negative weighing" reduces the output of the correlator to the threshold detector 128 so as to increase the difference in the outputs to the several threshold circuits for similar patterns. For example, it would ordinarily be desirable to attach "negative weighting" to those areas representing the "jot" in a Q in order to reduce the output of the "0" mask and avoid the false recognition of a Q (with a small jot) as an 0. To perform this function requires that the circuit be capable of subtraction in order to reduce the output signal to the threshold circuit.

Assuming that several cycles of carrier are transmitted down the delay line at the coincidence of each "one" in the data input 111 and each "high" input of the grating signal 115, it will be seen that light modulated by this carrier appears alternately at the positive weighting side of the bit area in the mask and at the negative side. As each burst of carrier passes a "slit" in the mask, light will pass through either the positive weighting area during which time it will be positively rectified by an associated phase-sensitive detector 124 or it will pass through the negatively weighted area and be rectified with the opposite polarity. The algebraic sum of all positively and negatively weighted signals is therefore built up in the filter of the phase-sensitive detector 124 as the signal progresses through the delay line 110. Since the same photocell is used to detect both positive and negative weighted signals, and since AC coupled amplifiers 130 are employed to supply the signal the phase-sensitive detector, drift and balance problems ordinarily associated with "DC" amplification and "summing" circuits are largely circumvented.

Figures 9, 10:
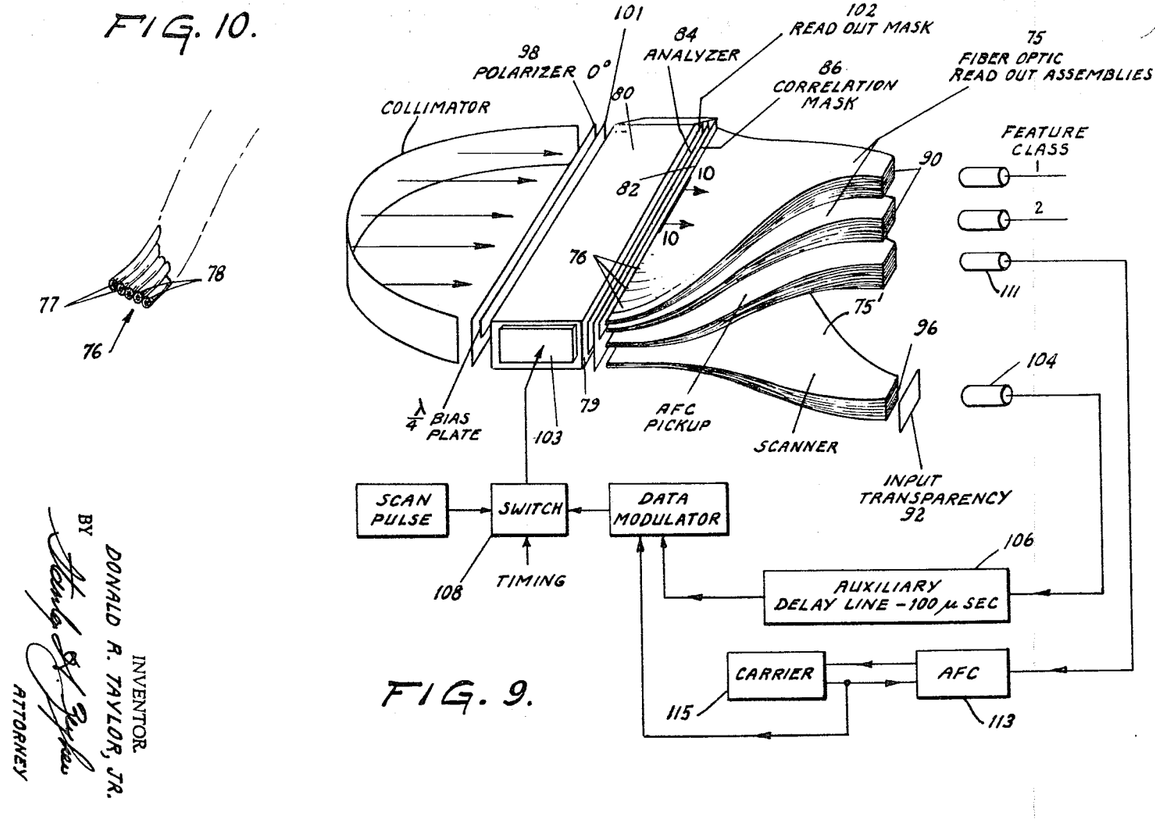
FIGURE 9 is a schematic illustration of another form of optical correlator embodying features of the present invention including provisions for self-scanning.
FIGURE 10 is a greatly enlarged perspective showing of a portion of one of the fiber optic bands used in the construction of the readout assemblies shown in FIGURE 9.

If it is desired to have the correlator perform its own scanning function, the embodiment shown in FIGURE 9 may be used. That embodiment illustrates how image scanning and correlation functions may be combined by using fiber optics in the light collection system. In that system each of the readout assemblies 75 is comprised of rows and tiers of one half inch wide strips 76. An enlarged perspective of a portion of one of the strips is illustrated in FIGURE 10. Each strip is composed of a plurality of cylindrical glass filaments 77 two mils in diameter having an index of refraction of 1.62. Each filament is encased in a glass mantle 78 of approximately four mils outside diameter having an index of refraction of 1.51. The individual filaments comprising each strip are conveniently bonded together to form a half inch wide flexible band. Thirty of these strips arrayed in a multiplicity of tiers are placed side-by-side in confronting relation to an edge 79 of the glass delay line 80 to provide readout along the length of the line. Interposed between the end face 82 of the optical fibers, and associated with feature classes 1 and 2 and the delay line 80 are a readout mask 102, an analyzer 84 and a correlation mask 86. To focus the light onto individual photocells associated with each of the recognition classes the strips are brought together at their outermost ends to form a rectangular bundle 90 of light transmitting filaments. The topographical transformation made possible by the use of fiber optics provides a highly selective and efficient light gathering and focusing system. To permit the correlator to perform its own image-scanning operation the system is modified to permit use of one of the readout assemblies 96 as the scanning element. A transparency 92 containing the image to be correlated is placed at the output end 96 of one of the assemblies 75' and the transmission axes of polarizer 98 and analyzer 84 are arranged to be at extinction by eliminating the quarter wave bias plate 101 from the optical path of the scanner. The readout and correlation masks 102 and 86 are also removed from this area. Scanning of the photograph is accomplished by introducing a single pulse of RF carrier at the transducer 103 and allowing it to travel down the delay line. The synchronizing pulse for the system might advantageously be used for this purpose. A photosensor 104 viewing the transparency 92 picks up the modulated light of the scanning spot and introduces this into a delay device 106 which might, for example, be a delay line such as the line 80 used in the correlation system, having a delay characteristic of 100 microseconds. When the scanning spot has proceeded through the delay line 80 the input to the transducer is switched, by means 108, to the data just arriving through the auxiliary delay line 106. This data propagates down the line 80 in serialized form and is viewed for correlation with the various recognition classes carried by the correlation mask 86. If desired, correlation masks may be placed adjacent the outputs 90 of the readout assemblies 75. The photosensors indicate the running degree of correlation. By this arrangement, the delay line serves both a scanning and correlation function.

To synchronize the carrier with the readout slits an automatic frequency control circuit is provided. The synchronizing signal for this purpose may be derived from one of the readout assemblies 75 arranged to serve as an AFC pickup. The correlation mask is removed from this area to permit the photosensor 111 associated with that assembly to view the scanning pulse as it proceeds down the delay line in back of the readout slit grating 102. To optimize performance the quarter wave bias plate is also eliminated. The signal which is generated supplies a "reference frequency" to the AFC system 113 which compares it with the output of the carrier oscillator 115 and adjusts the frequency of the carrier oscillator substantially to eliminate any frequency difference.

When the self-scanning arrangement is used the scanned input photograph is cross correlated with itself, as well as with the other feature classes in the output array, during the correlation time interval. The resultant light reaching the photosensor through the input image represents the correlation of the input photograph shifted sequentially to all possible registry positions with respect to itself. A whole image output can be obtained either by cathode ray tube monitor or by exposing a photographic plate over the entire interval.

Since the correlation patterns are produced in scanned form during the correlation interval, it is possible to reinsert this information into the correlator, after delaying it by one hundred microseconds, and to use this pattern, instead of the original image, for cross correlation with other pattern templates. By this arrangement, the output of any of the feature class photosensors can be used as an input to the correlator.

The ability to examine large blocks of data for agreement with an inserted template can be applied to the problem of high speed memory searching. In this instance, the input data is inserted as the template set and the contents of the memory, which is clocked with the delay line, are sequentially read into the delay line. A match between the requested data and the content of the memory produces a high correlation output which, by its location in time, indicates the memory location of the desired information. The degree of correlation required for defining a "match" can be controlled by threshold circuit adjustments by means well known in the art.

In summary, applicant has discovered that a high speed fast access correlator of high storage capacity can be constructed by the unique use of photoelastic delay means for transient storage of data to be correlated in combination with means permitting optical readout of that information and direct comparison thereof with correlation templates. By this novel approach a correlator can be adjusted to handle different recognition problems by merely changing photographic masks and without the need for converting the photographic pattern against which correlation is to be made into an electrical signal.

While preferred forms of the present invention have been depicted and described, it will be understood by those skilled in the art that the invention is susceptible of detail changes and modifications without departing from the essential concepts thereof.

I claim:
1. In a correlator, the combination comprising:
 (a) a pair of crossed polarizers;
 (b) birefractive delay means interposed between said polarizers;
 (c) means for generating a high frequency carrier;
 (d) means for translating information to be correlated into an electrical signal which means comprises a plurality of strips of optical fibers, ends of which are arranged in side-by-side relation closely adjacent a face of said delay line, and opposite ends of which are topographically aranged to convert a pulse of high frequency carrier traversing said delay line into a raster scanning the source of such information;
 (e) means for amplitude modulating said carrier with said signal;
 (f) means for transducing said modulated carrier into an ultrasonic vibration for propagation through said delay means as a series of amplitude-modulated stress waves;
 (g) means for projecting a collimated beam of light through said polarizers and delay means in a direction transverse the axis of stress propagation;
 (h) readout means comprising a plurality of equispaced light transmissive slits serially aligned contiguous the propagation axis of said delay line;
 (i) means for selectively transmitting light signals from said readout slits; and
 (j) means for utilizing transmitted signals to indicate correlation.

2. In a correlator, the combination comprising:
 (a) a pair of cross polarizers;
 (b) birefractive delay means interposed between said polarizers;
 (c) means for generating a high frequency carrier;
 (d) means for translating information to be correlated into an electrical signal corresponding to bits of information;

(e) means for amplitude modulating said carrier with said signal;
(f) means for transducing said modulated carrier into an ultrasonic vibration for propagation through said delay means as a series of amplitude-modulated stress waves;
(g) means for projecting a collimated beam of light through said polarizers and delay means in a direction transverse the axis of stress propagation;
(h) readout means comprising a correlation mask having a series of clear and opaque areas for each bit location in the delay means;
(i) photosensor means including optical means for gathering the light output of said readout means;
(j) means associated with said photosensor means and including amplifier means and a phase sensitive detector; and
(k) means comprising a grating generator and AND gate means for modulating the bit signals so as to produce a zero carrier signal period for every bit of input data to be correlated, said grating generator supplying a reference signal to said phase sensitive detector to produce output signals the polarities of which are determined by their correlation with said correlation mask.

3. In a correlator, the combination comprising:
(a) a pair of crossed polarizers;
(b) birefractive delay means interposed between said polarizers;
(c) means for generating a high frequency carrier;
(d) means for translating information to be correlated into an electrical signal;
(e) means for amplitude modulating said carrier with said signal;
(f) means for transducing said modulated carrier into an ultrasonic vibration for propagation through said delay means as a series of amplitude-modulated stress waves;
(g) means for projecting a collimated beam of light through said polarizers and delay means in a direction transverse the axis of stress propagation,
(h) readout means comprising a plurality of equally spaced light-transmissive slits serially aligned contiguous the propagation axis of said delay means and spaced apart a distance equal to one half the wave length of the carier frequency;
(i) means for selectively transmitting light signals from said readout slits; and
(j) means for utilizing transmitted signals to indicate correlation including means for detecting the phase relationship of said readout signals.

References Cited
UNITED STATES PATENTS

| | | | |
|---|---|---|---|
| 2,418,964 | 4/1947 | Arenberg | 161—15.2 |
| 2,451,465 | 10/1948 | Barney | 250—41.2 |
| 2,622,470 | 12/1952 | Rines | 88—14 |
| 3,088,113 | 4/1963 | Rosenthal | 343—17.1 |
| 3,104,370 | 9/1963 | Rabinow | 340—146.3 |
| 3,106,881 | 10/1963 | Kapur | 95—4.5 |
| 3,227,034 | 1/1966 | Shelton | 88—1 |
| 3,232,201 | 2/1966 | Frank et al. | 95—75 |
| 3,255,357 | 6/1966 | Kapany et al. | 250—227 |

MALCOLM A. MORRISON, *Primary Examiner.*

F. D. GRUBER, *Assistant Examiner.*

U.S. Cl. X.R.

324—77; 350—96, 149, 161